United States Patent
Qie et al.

(10) Patent No.: US 10,221,343 B2
(45) Date of Patent: *Mar. 5, 2019

(54) ONE PART, FAST-SETTING, AQUEOUS ADHESIVE EMULSIONS

(71) Applicant: 3M INNOVATIVE PROPERTIES COMPANY, St. Paul, MN (US)

(72) Inventors: Lili Qie, Woodbury, MN (US); Alison K. Graske, Stillwater, MN (US); Glenn S. Prementine, White Bear Lake, MN (US); David J. Drath, Lakeland, MN (US); Biing-Huei D. Su, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/610,866

(22) Filed: Jun. 1, 2017

(65) Prior Publication Data

US 2017/0267901 A1 Sep. 21, 2017

Related U.S. Application Data

(62) Division of application No. 14/389,537, filed as application No. PCT/US2013/034521 on Mar. 29, 2013, now Pat. No. 9,695,344.

(60) Provisional application No. 61/618,069, filed on Mar. 30, 2012.

(51) Int. Cl.
| | |
|---|---|
| *B32B 27/42* | (2006.01) |
| *B32B 27/30* | (2006.01) |
| *C09J 133/04* | (2006.01) |
| *C09J 161/00* | (2006.01) |
| *C09J 133/08* | (2006.01) |
| *C08L 33/06* | (2006.01) |
| *C08F 265/06* | (2006.01) |
| *C09J 151/06* | (2006.01) |
| *B32B 37/00* | (2006.01) |

(52) U.S. Cl.
CPC ......... *C09J 133/08* (2013.01); *B32B 37/0038* (2013.01); *C08F 265/06* (2013.01); *C09J 151/06* (2013.01); *B32B 2255/26* (2013.01); *B32B 2333/12* (2013.01); *C08L 2207/53* (2013.01); *Y10T 428/31935* (2015.04)

(58) Field of Classification Search
USPC .......................................... 428/332; 523/201
See application file for complete search history.

(56) References Cited

U.S. PATENT DOCUMENTS

| | | |
|---|---|---|
| 4,047,965 A | 9/1977 | Karst et al. |
| 4,948,822 A | 8/1990 | Iovine et al. |
| 5,230,956 A | 7/1993 | Cole et al. |
| 5,543,455 A | 8/1996 | Shah |
| 6,086,997 A | 7/2000 | Patel et al. |
| 6,262,144 B1 | 7/2001 | Zhao et al. |
| 6,605,662 B2 | 8/2003 | Zhao et al. |
| 9,695,344 B2 * | 7/2017 | Qie ...................... C08F 265/06 |
| 2006/0235131 A1 | 10/2006 | Hughes et al. |
| 2011/0136975 A1 | 6/2011 | Breiner et al. |
| 2014/0058031 A1 | 2/2014 | Overbeek et al. |
| 2014/0065435 A1 | 3/2014 | Overbeek |

FOREIGN PATENT DOCUMENTS

| | | |
|---|---|---|
| EP | 0 175 484 | 3/1986 |
| EP | 1 479 699 | 11/2004 |
| EP | 2 246 403 | 11/2010 |

OTHER PUBLICATIONS

PCT International Search Report from PCT/US2013/034521 dated Sep. 25, 2013, 4 pages.

Xu, Wei et al., "The Relation Between Particle Structure and the Peel Strength of Vinyl Acetate/Acrylate Core-Shell Latexes Laminating Adhesives", Polymer-Plastics Technology and Engineering, 51: 35-42, 2012, 8 pages.

* cited by examiner

*Primary Examiner* — Tae H Yoon
(74) *Attorney, Agent, or Firm* — Steven A. Bern; Philip Y. Dahl

(57) ABSTRACT

The present disclosure relates to acrylic adhesive emulsions comprising a core-shell polymeric component comprising an inner core and an outer shell containing at least one pendent functional group; a polyfunctional component capable of reacting with at least one of the pendent functional groups on the outer shell; wherein the inner core is free of functional groups reactive with the pendent functional groups on the outer shell; and wherein the pH of the emulsion is 6.5 or less; and wherein the emulsion is a fast-setting, one part, aqueous, adhesive. Bonded articles made therefrom, and methods of bonding articles using these emulsions are also disclosed.

16 Claims, No Drawings

ONE PART, FAST-SETTING, AQUEOUS ADHESIVE EMULSIONS

CROSS-REFERENCES TO RELATED APPLICATIONS

This application is a divisional of U.S. application Ser. No. 14/389,537 filed Sep. 30, 2014, issued Jul. 4, 2017 as U.S. Pat. No. 9,695,344; which is a national stage filing under 35 U.S.C. 371 of PCT/US2013/034521, filed Mar. 29, 2013; which claims the benefit of U.S. Provisional Application No. 61/618,069, filed Mar. 30, 2012, the disclosures of which are incorporated by reference in their entireties herein.

FIELD

The present disclosure relates to one part, aqueous-based, acrylic adhesive emulsions, bonded articles made therefrom, and methods of bonding articles using these emulsions.

BACKGROUND

In the furniture industry, and related industries, a wide range of substrates must be adhered, including wood; metal, such as cold-rolled steel and aluminum; fabric; paper; leather; foam; plastic, such as polyvinylchloride, polystyrene, polyethylene, polypropylene, and acrylonitrile-butadiene-styrene (ABS), fiberglass, and materials used to construct high pressure laminates, for example, for counter tops.

As used herein a contact adhesive refers to an adhesive which must be applied to both substrates to be joined and allowed some time to dry, typically up to 24 hours before the two substrates are pushed together. Once the substrates are pushed together, the bond forms very quickly and it is usually not necessary to apply pressure for a long time. Some contact adhesives are able to provide bonded substrates that exhibit handling strengths within 20 seconds to 5 minutes after application to the substrates. That is, a bond of sufficient strength is formed to hold the substrates together and resist subsequent forces on the fresh bond-line which might cause failure. Adhesives that provide the desired handling strength soon after application and bonding are typically referred to as "fast-set" or "fast-setting" adhesives. To determine whether an adhesive is a fast-set adhesive, a pinch bond test may be utilized.

Pinch bonds, or knife-edge bonds, are used to evaluate if an adhesive formulation exhibits the desired handling strength characteristics that in turn enable immediate handling and processing during manufacture of foam rubber cushions used in furniture. Such bonds require more strength build-up than needed to form a typical bond since the former results in a bond-line under stress once the bond is made whereas the latter does not.

In the past, foam and furniture manufacturing has been dominated by one part contact adhesives dissolved or dispersed in organic solvents, such as chlorinated solvents and low flash point organic solvents. Such one part contact adhesives are conveniently able to be applied using a single source (i.e., container). However, there has been a desire to shift from organic, solvent-based adhesive compositions to aqueous-based or aqueous-dispersed adhesive compositions for environmental reasons.

It is desirable to find an aqueous-based adhesive that can be used as a fast-set adhesive. Attempts to provide them in one part form, however, have experienced only gradual industry acceptance since they have longer dry times than conventional organic, solvent-based adhesives, as well as a relatively slow rate of strength build. To overcome such limitations, two part (i.e., co-sprayed from two separate containers) aqueous-dispersed adhesive systems have been developed that demonstrate high adhesive strength within seconds of spraying. The adhesive composition is one part of the two-part system. An external coagulant, such as citric acid, lactic acid, acetic acid, or zinc sulfate, is typically used as the second part in a predetermined ratio with respect to the first part. Such two part adhesive systems, however, are not entirely satisfactory. The co-spraying equipment is expensive, the equipment requires maintenance, and the ratio of the two parts (the coagulant and the adhesive composition) must be monitored during application.

U.S. Pat. No. 6,086,997 to Patel et al. describe a storage stable, fast-setting, one part, aqueous contact adhesive composition comprising an adhesive component and boric acid. The boric acid is utilized as an internal coagulant and can be added in the form of a solution, or it can be generated in-situ. The adhesive component comprises at least one polychloroprene. The adhesive component may optionally comprise a mixture of polychloroprene and natural rubber, synthetic rubber, or combinations thereof. The adhesive component is substantially free (i.e., contains 5% by weight or less) of acrylates and can also contain an amino acid as an internal coagulant, such as glycine. It is disclosed that the addition of boric acid enables the pH of the polychloroprene adhesive composition to be lowered while still maintaining good shelf life. "Shelf life" is defined as the time period after which the aqueous composition has substantially coagulated, congealed, curdled, separated, settled, or formed non-easily mixable or non-easily dispersible layers so that it may not be usefully or readily applied as a homogeneous, uniform liquid blend by spray-coating methods. That is, compositions that have good shelf life are storage stable. "Storage stable," is defined as meaning the aqueous compositions have a shelf life of greater than about four months when stored at room temperature (25° C. S.T.P.). "Fast-setting," is described as referring to an adhesive composition that develops strength sufficient to form a bond when finger pressure is applied (i.e., a finger bond) in less than about 10 minutes after application of the adhesive to the substrate to be bonded. For some applications, e.g., bonding foam in the furniture industry, fast-setting adhesives desirably develop a finger bond within 90 seconds or less after application. The compositions are disclosed to be fast-setting due to the low pH of the compositions, which is preferably in the range of about 7 to about 9.5. The one part, fast-setting, storage stable, aqueous adhesive composition may be applied by spraying from one container.

U.S. Pat. No. 5,543,455 to Shah describes a waterborne adhesive comprising an aqueous emulsion of A) between about 50 and about 80 weight percent solids (based on A plus B) of an emulsified acrylic polymer, said acrylic polymer having an acid number of between about 5 and about 50, and an N-methylol acrylamide content of between about 0.5 and about 5 wt % based on monomer solids; B) between about 20 and about 50 weight percent solids (based on A plus B) of a latex of an elastomer, eg., rubber latexes such as natural rubber, neoprene, etc., and C) anionic surfactant in amount sufficient to stabilize the aqueous dispersion of A) and B). It is disclosed that N-methylol acrylamide is an essential monomer. The elastomer latex B) is said to be necessary for good bonding to be achieved as the acrylic resin alone does not give good bonding as a latex adhesive. It is also taught that contact adhesives based primarily on neoprene do not give good high-temperature adhesion and, accordingly, the acrylic polymer A) is used at a level of between about 50 and about 80 wt % and the elastomer latex B) is used at between about 20 and about 50 wt % (based on A plus B). The final pH of the waterborne composition is disclosed to be between about 7 and about 11.

EP 2246403 A1 to Motzet et al. describe floor or contact adhesives which are provided as a water-borne formulation comprising: a cross-linkable binder resin having a glass transition temperature (Tg) of less than +10° C.; optionally, a crosslinking agent; and, optionally a tackifier and/or a plasticiser; wherein the volatile organic compound (VOC) level of said formulation is less than 0.5% by weight. It is stated the cross-linkable binder resin should preferably have a glass transition temperature (Tg) in the range from +10° C. to −90° C. and furthermore should preferably comprise a carbonyl functional (meth)acrylate or vinyl copolymer prepared from a monomer mixture comprising alkyl (meth) acrylate ester monomers and/or vinyl monomers, and diacetonacrylamide (DAAM) monomers. Acrylic-based, carbonyl-functional binder emulsions having pH values of 6.9 and greater are exemplified. These were used to prepare adhesive compositions having pH values of 7.2 or greater.

A one-part laminating adhesive composition based on an acrylic polymer prepared by a "core-shell" emulsion polymerization process is disclosed in U.S. Pat. No. 4,948,822 to Iovine and Walker. The adhesive composition is based on an acrylic copolymer comprising a core and a shell in which a latently reactive, functional comonomer (for example, glycidyl methacrylate) is placed in the core and a second functional comonomer reactive with the first comonomer is placed in the shell. Monomers useful for preparing the acrylic polymer employed in the adhesives described therein are selected to provide a core-shell polymer wherein both the core and shell polymer will have a Tg of about −10 to −35° C. The weight ratio of core to shell monomers employed in preparing the polymer is stated to be in the range from about 2:1 to 5:1 (67-83 wt %). Typically, the adhesive is coated on a film and allowed to dry at room temperature (or dried at moderate heat). The adhesive coated film is then laminated to a desired substrate, for example, a corona treated polyethylene or polypropylene film or other lamina by passing through a "hot nip" roller. The resultant laminate is stated to form an immediate bond which gains strength on room temperature standing resulting from the polymeric hardening or curing. It is understood that the heat from the "nip" step employed in the laminating process is sufficient to permit the functional comonomers to react with one another and thereby to initiate hardening, ionic bonding or crosslinking of the polymer. The core-shell technology is used to effectively separate the reactive functional comonomers until such time as reactivity is desired.

The prior art does not provide an aqueous-based, one part adhesive that is free of various additives such as coagulants and storage stabilizers, free, or at least substantially free (e.g., less than 30 wt %, or less than 15 wt %, or even less than 5 wt %), of natural rubbers and halogenated polymers such as polychloroprene, that is fast-setting at room temperature, that can be applied to either one or both substrates to be bonded, and that provides bonded substrates that initially can be repositioned.

SUMMARY

It is desirable to provide an aqueous-based, one part adhesive that is free, or at least substantially free (e.g., less than 30 wt %, or less than 15 wt %, or even less than 5 wt %) of halogenated polymers such as polychloroprene. It would be of further advantage if such compositions were free, or at least substantially free (e.g., less than 30 wt %, or less than 15 wt %, or even less than 5 wt %), of natural rubbers due to the presence of proteins in the latexes of such materials which can cause of skin allergies.

Desirably the adhesive would be storage stable, yet fast-setting and able to quickly provide sufficient handling strength. By "storage stable" it is meant that a one part, aqueous, adhesive emulsion is able to provide consistent properties and performance even after storage at 120° F. (49° C.) for 28 days. It would also be desirable for the adhesive to be capable of developing sufficient strength for demanding applications within a short period of time. In addition, it would be advantageous if the adhesive was applicable by spraying from a single container. It would further be desirable to provide such adhesives that did not require the use of various additives such as strong alkali components, e.g., potassium hydroxide, to stabilize the composition during storage as is necessary when polychloroprene is employed, or coagulants such as boric acid or glycine. Such adhesives would desirably permit repositionability of two joined substrates prior to development of appreciable bond strength. In addition, it would be advantageous if such adhesive compositions need be applied to only one of the substrates prior to bonding.

The one part, fast-setting, aqueous adhesive emulsions of the present disclosure address the aforementioned needs. The emulsions described herein provide formulations that are free of halogenated polymers, natural rubber polymers, and non-aqueous solvents. In addition, these emulsions are able to provide fast-setting bonds which exhibit good handling strength. Furthermore, the emulsions of the present disclosure can be provided as one part, sprayable compositions. Articles bonded with these emulsions are repositionable after the initial bond has been made, as well as separable and re-bondable.

In one aspect the present disclosure provides an emulsion comprising:
a) a core-shell polymeric component comprising:
i. an inner core comprising a (meth)acrylate copolymer having a first glass transition temperature, and
ii. an outer shell comprising a (meth)acrylate copolymer containing at least one pendent functional group and having a second glass transition temperature which is less than, or equal to, the first glass transition temperature;
b) a polyfunctional component capable of reacting with at least one of the pendent functional groups on the outer shell;
wherein the inner core is free of functional groups reactive with the pendent functional groups on the outer shell; and
wherein the pH of the emulsion is 6.5 or less; and
wherein the emulsion is a fast-setting, one part, aqueous, adhesive.

In some embodiments, the emulsion has a first glass transition temperature of +10° C. or less. In some embodiments, the emulsion further includes an anionic surfactant. In some embodiments, the emulsion has a surfactant content of 1.5 parts (dry), or less, per 100 parts of core-shell polymer.

In some embodiments the number of functional group equivalents on the polyfunctional component is 0.5 to 1.5 for each pendent functional group equivalent on the polymeric shell component. In some embodiments the pendent functional group is selected from ketones and aldehydes. In some embodiments, the polyfunctional component is selected from the group consisting of polyhydrazides and polyamines.

In some embodiments, the core-shell component comprises between 25 and 83 wt % of the core component. In some embodiments the particles of the emulsion have a diameter of 200 nm or less. In some embodiments the aqueous adhesive emulsion is of free of non-aqueous solvents, although small amounts may be employed if desired (e.g., 3 wt % or less).

In some embodiments the present disclosure provides an article comprising at least two substrates bonded together with the fast-setting, one part, aqueous-based adhesive emulsion of the present disclosure. In some embodiments an article comprising at least two substrates joined together with the fast-setting, one part, aqueous-based adhesive emulsion composition of the present disclosure is provided wherein the two substrates are repositionable with respect to each other. In a some embodiment a separably joined article comprising at least two substrates joined together with the fast-setting, one part, aqueous-based adhesive emulsion of the present disclosure is provided.

In another aspect, the present disclosure provides a method of joining at least two substrates together. The method includes application of the fast-setting, one part, aqueous-based adhesive emulsion of the present disclosure onto at least one of the substrates. In some embodiments, the method further comprises applying the fast-setting, one part, aqueous-based adhesive emulsion onto at least one of the substrates, joining them together, and repositioning the substrates. In some embodiments, the method of application is selected from the group consisting of brushing, spraying, wiping, rolling, or by mechanical printing methods such as gravure and curtain coating. In some embodiments, the method of application consists of spraying the fast-setting, one part, aqueous-based adhesive emulsion from a single container.

DETAILED DESCRIPTION

Before any embodiments of the disclosure are explained in detail, it is to be understood that the disclosure is not limited in its application to the details of construction and the arrangement of components set forth in the following description. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. As used herein the term "(meth) acrylic" is intended to include both acrylic and methacrylic type monomers and polymers. (Meth)acrylic monomers include both (meth)acrylic esters, also referred to herein as (meth)acrylates, and the (meth)acrylic acids from which they are derived. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

Core-Shell Polymeric Particles

The fast-setting, one part, aqueous, acrylic adhesive emulsions of the present disclosure contain core-shell polymeric particles, also referred to herein as the core-shell polymer or core-shell polymeric component.

The core-shell polymer comprises an inner polymeric core component and an outer polymeric shell component. Both components may be prepared from the copolymerization of one or more ethylenically unsaturated monomers. Such monomers include ethylenically unsaturated carboxylic acids and their corresponding esters. One example of such monomers are the (meth)acrylic monomers.

Polymeric Core Component

The ethylenically unsaturated carboxylic ester monomers useful in preparing the inner polymeric core component are reaction products of ethylenically unsaturated carboxylic acids and alcohols having 1 to 20 carbon atoms, also referred to as C1 to C20 alcohols. Ethylenically unsaturated ester monomers useful in the present disclosure include (meth)acrylate monomers. Such monomers include, but are not limited to, methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, benzyl (meth)acrylate, 2-ethylhexyl (meth)acrylate, heptyl (meth)acrylate, n-octyl (meth)acrylate, isooctyl (methyl)acrylate, nonyl (meth)acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth)acrylate, norbornyl (meth)acrylate, 4-t-butylcyclohexyl (meth)acrylate, 3,3,5-trimethylcyclohexyl (meth)acrylate, dimethyl maleate, n-butyl maleate, cyclopentadienyl (meth)acrylate, carbodiimide (meth)acrylate, t-butylaminoethyl (meth)acrylate, 2-t-butylaminoethyl (meth)acrylate, and N,N-dimethylaminoethyl (meth)acrylate.

Examples of ethylenically unsaturated carboxylic acid monomers useful for preparing the ethylenically unsaturated carboxylic ester monomers described above include, but are not limited to, (meth)acrylic acid, maleic acid, fumaric acid, itaconic acid, ethacrylic acid, crotonic acid, citraconic acid, and cinnamic acid, as well as the salts of these acids including alkali metal salts and ammonium salts. In addition, these monomers may be copolymerized with the aforementioned ethylenically unsaturated ester monomers to prepare the core component.

Aromatic compounds containing ethylenically unsaturated sites external to the aromatic ring may be used as comonomers. Examples of such materials include, but are not limited to, styrene, alpha-methyl styrene, alpha-phenyl styrene, styrene sulfonic acid, para-acetoxystyrene, vinyl toluene, and vinyl naphthalene.

Another class of ethylenically unsaturated esters which may be used in the present disclosure are vinyl esters. Examples of vinyl esters of carboxylic acids having 1 to 20 carbon atoms include, but are not limited to, vinyl acetate, vinyl propionate, vinyl n-butyrate, vinyl laurate, vinyl caprate (n-decanoate), and vinyl stearate (n-octadecanoate). Also included are branched vinyl esters, called versatic acids or vinyl neodecanoates. Examples of these include, but are not limited to, those commercially available under the trade designations "VEOVA 9" and "VEOVA 10" (from Momentive Specialty Chemicals, Incorporated, Gahanna, Ohio, and vinyl pivalate.

The core component may also include multi-ethylenically unsaturated functional monomers such as, for example, 1,6-hexanediol di(meth)acrylate, divinyl benzene, allyl methacrylate, diallyl maleate, and diallyl phthalate, and alkylene glycol di(meth)acrylates such as ethylene glycol di(meth)acrylate, 1,3-butylene glycol di(meth)acrylate, 1,4-butylene glycol di(meth)acrylate, dipropylene glycol di(meth)acrylate, tripropylene glycol di(meth)acrylate, and trimethylolpropane tri(meth)acrylate.

The monomer components of the polymeric core are selected and used in amounts such that the resulting polymer exhibits a glass transition temperature (Tg), herein referred to as the "first glass transition temperature", which is greater than or equal to the glass transition temperature of the polymeric shell component. In one embodiment the Tg of the polymeric core component is 10° C. or less as calculated using the Fox equation.

The polymeric core component does not contain any (i.e., is free of) pendent functionality that would react with any pendent functional groups present in the polymeric shell component. By "pendent functionality" and "pendent functional groups" it is meant any reactive groups that remain after polymerization of the monomers used to prepare the core and shell components. Such groups may be located along the polymer chain or at its' ends. While not wishing to be bound by theory, it is believed that although such bonding between the core and shell components might result in improved resistance to solvent or water, and be characterized by an increased gel content, it would also result in reduced flexibility characteristics, which would be disadvantageous in furniture and foam bonding applications. Internal crosslinking within the polymeric core component would be expected to have the same effects.

Polymeric Shell Component

The polymeric shell component may be prepared from the same materials as described above for the polymeric core component, except that multi-ethylenically unsaturated monomers are not included. In addition, a monomer containing at least one pendent functional group is included in the preparation of the shell component. Such functional groups include hydroxy-containing monomers such as 2-hydroxyethyl (meth)acrylate, hydroxypropyl (meth)acrylates, and hydroxybutyl (meth)acrylates (when reference is made to "hydroxyalkyl (meth)acrylates", the reference includes a reference to all possibilities where the hydroxyl group may be attached to the alkyl group); epoxy or glycidyl-containing monomers such as glycidyl (meth)acrylate; aldehyde or ketone-containing monomers such as acrolein or diacetone acrylamide (N-(1,1-dimethyl-3-oxobutyl)-acrylamide); acetoacetates such as 2[(2-methyl-1-oxo-2-propenyl)oxy] ethyl 3-oxobutanoate (available as Acetoacetoxyethyl Methacrylate (AAEM) from Eastman Chemical Company, Kingsport, Tenn.); and carbodiimides.

In one embodiment, the shell component has a more hydrophilic character than the core component. While not wishing to be bound by theory, it is believed that such a characteristic can aid in the migration of the polyfunctional component to the shell component of the emulsified polymeric core-shell particle and reaction therewith.

Two or more monomers having different pendent functional groups may be used in the preparation of the polymeric shell component, provided that they do not react with one another.

The monomer components of the polymeric shell are selected and used in amounts such that the resulting polymer exhibits a Tg, herein referred to as the "second glass transition temperature", which is less than or equal to the glass transition temperature of the core component. In one embodiment the Tg of the polymeric shell is 0° C. or less as calculated using the Fox equation.

In some embodiments, the polymeric core comprises a reaction product by weight of from about 50% to about 100% alkyl (meth)acrylate having 1 to 20 carbon atoms, from about 0% to about 5% ethylenically unsaturated carboxylic acid, from 0% to about 50% of a copolymerizable monomer.

In some embodiments, the polymeric shell comprises a reaction product by weight of from about 50% to about 100% alkyl (meth)acrylate having 1 to 20 carbon, from about 0% to about 10% ethylenically unsaturated carboxylic acid, from 0.5% to about 5% of a copolymerizable monomer containing a pendent functional group, and from 0% to about 50% of a copolymerizable monomer.

The core-shell polymer of the present disclosure comprises at least 25 wt % of the core component. In further embodiments it contains at least 50 wt % of the core component. In still further embodiments it contains 83 wt % or less of the core component. In some embodiments, it contains 70 wt % or less of the core component. In some embodiments the core-shell polymer contains between 59 and 65 wt % of the core component.

Polyfunctional Component

The fast-setting, one part, aqueous, acrylic adhesive emulsions of the present disclosure also include a polyfunctional component. The polyfunctional component contains at least two functional groups that are capable of reacting with at least some of the pendent functional groups present in the polymeric shell component and provides a means of externally crosslinking the core-shell polymeric particles. Examples of polyfunctional components include polyfunctional hydrazides of diacids such as: oxalic acid, maleic acid, malonic acid, succinic acid, glutaric acid, and adipic acid. Examples include adipic dihydrazide, ethylmalonic acid dihydrazide; fumaric acid dihydrazide; tartaric acid dihydrazide; pimelic acid dihydrazide; itaconic acid dihydrazide; 9,10-dihydro-9,10-ethanoanthracene-11,12-dicarboxylic acid dihydrazide; 1,14-tetradecanoic dicarboxylacid dihydrazide; 1,20-icosanedioic acid dihydrazide; valine dihydrazide; orthophthalic acid dihydrazide; isophthalic acid dihydrazide; terephthalic acid dihydrazide; sebacic acid dihydrazide; cyclohexane dicarboxylic acid bis-hydrazides; azelaic acid bis-hydrazides. Another useful class of polyfunctional components are polyfunctional hydrazines such as dihydrazinoalkynones, and dihydrazines of aromatic hydrocarbons e.g. 1,4-dihydrazinebenzene and 2,3-dihydrazinonaphthalene. Other types of polyfunctional components that may be used include polyfunctional amines such as ethylene diamine, 1,2-propylene diamine, 1,3-propylene diamine, 1,6-hexanediamine; polyfunctional enamines; polyfunctional aldehydes derived from the aforementioned diacids such as, for example, adipic dialdehyde, glutaric dialdehyde, succinic dialdehyde, and oxalic dialdehyde; polyfunctional alcohols such as ethylene glycol, propylene glycol, 1,4-butanediol, 1,6-hexanediol, and glycerol.

For example, polyfunctional hydrazides, hydrazines, amines, and enamines may be used to react with pendent epoxy, glycidyl, aldehyde, ketone, acetoacetate, and carbodiimide groups present on the polymeric shell component. Polyfunctional aldehydes may be used when the polymeric shell component contains pendent acetoacetate groups. Polyfunctional alcohols are suitable for use when the polymeric shell component contains carbodiimide groups.

In other embodiments a polyfunctional component may be employed in which there are two, or more, different functional groups present, provided that they do not react with one another In some embodiments of the present disclosure two or more polyfunctional components may be used in which the functional groups on each polyfunctional component are different from the functional groups present on the other polyfunctional component(s), provided they do not react with one another.

In some embodiments the various types of functionality described as being useful on the shell component of the core-shell polymer and on the polyfunctional component may be reversed. That is, for example, the pendent functional group on the shell component may be an amine and the functional group on the polyfunctional component may be one or more of the following: epoxy, glycidyl, aldehyde, ketone, acetoacetate, and carbodiimide.

The amount of the polyfunctional component is chosen such that there are between 0.5 and 1.5 equivalents of functional groups from the polyfunctional component for each equivalent of pendent functional group on the shell component of the core-shell polymer. In one embodiment a ratio of 1:1 is employed.

Preparation of Core-Shell Emulsion

The polymerization process for preparing the polymer emulsions disclosed herein is carried out according to standard emulsion polymerization procedures employing successive monomer charges. A representative polymerization process involves at least two distinct stages: the first incorporating the comonomers for the core portion of the polymer and the second incorporating the comonomers for the shell portion of the polymer. The many parameters of emulsion polymerization technique can be adjusted by those skilled in the art to obtain particular desired results. Initiator can also be added according to a variety of possible schedules. Thus one or more of the comonomers can be emulsified first in the stirred aqueous phase before initiation is begun. Monomers can be added continuously or in staggered increments. Additionally, a polymerization can be started in the presence of a previously prepared seed.

In the production of core-shell polymer, it is important that the surfactant system is designed to minimize or eliminate new particle formation during the second stage, i.e., polymerization of the shell. Typical useful surfactants (i.e. micelle-forming) for this stage include sodium lauryl sulfate, sodium lauryl ether sulfate, sodium dodecylbenzene sulfonate and sulfosuccinate esters. In the shell polymerization stage the surfactant may be eliminated entirely. Thus, in designing particular polymerization reaction sequences, the core polymerization should be conducted to promote polymer particle formation, while the subsequent shell polymerization should promote polymer formation on the core surface. In the multistage polymerization process employed in the present disclosure, the process is designed to first favor production of polymeric core particles followed by formation of a shell polymer around the core. For purposes of this disclosure, the "core-shell" copolymers described and produced by the multistage process described herein are intended to include those copolymers which possess a core and shell and also those copolymers which possess a core and shell and an intermediate component. All of the copolymers useful in the present disclosure will possess the latent reactivity of the functional comonomers polymerized therein. Core-shell polymerization is well known to those skilled in the art and is described in, for example, U.S. Pat. No. 4,091,162 to Smith & McLaurin Limited.

An anionic surfactant is employed in the adhesive emulsion preparation. Useful anionic surfactants include but are not limited to those whose molecular structure includes at least one hydrophobic moiety selected from the group consisting of from about 6 carbon atom to about 12 carbon atom-alkyl, alkylaryl, and/or alkenyl groups as well as at least one anionic group selected from carboxylate, sulfate, sulfonate, phosphate, polyoxyethylene sulfate, polyoxyethylene sulfonate, polyoxyethylene phosphate, and the like, and/or the salts of such anionic groups, wherein said salts are selected from the group consisting of alkali metal salts (eg., sodium, potassium), ammonium salts, tertiary amino salts, and the like. In addition, any fatty acid soap (e.g. alkyl succinates), ethoxylated fatty acids, and/or the alkali metal salts (eg., sodium, potassium), ammonium salts, tertiary amino salts of fatty acids; dialkylsulfosuccinates; sulfated oils. Representative commercial examples of anionic surfactants include sodium lauryl sulfate, available from Stepan Chemical Co. under the trade designation "POLYSTEP B-3"; sodium lauryl ether sulfate, available from Stepan Chemical Co. under the trade designation "POLYSTEP B-12"; and sodium dodecylbenzenesulfonate, available from Rhodia, Incorporated under the trade designation "RHODACAL DS-10".

The total amount of surfactant used in the preparation of the emulsion is 1.5 parts or less by weight per 100 parts by weight of the total core-shell polymeric component. In some embodiments the total amount of surfactant is 1.3 parts by weight per 100 parts by weight of the total core-shell polymeric component. In some embodiments the total amount of surfactant employed is anionic in nature.

In some embodiments a small amount (e.g., less than 5 wt % of the total surfactant amount) of non-ionic surfactant may be employed if desired. Such surfactants are well known to those skilled in the art. Representative commercial examples of non-ionic surfactants include the "TRITON X" series of surfactants (octylphenol ethoxylates) and "TRITON CG 600" (a polyalkyl glucoside) available from Dow Chemical Company.

In some embodiments a small amount (e.g., less than 5 wt % of the total surfactant amount) of an ionic surfactant copolymerizable with the monomer mixture may also be present. The ionic copolymerizable surfactant has at least one group, or only one group, capable of reacting with the copolymerizable monomer mixture. Such reactive groups include but are not limited to those groups selected from the group consisting of ethylenically unsaturated groups such as vinyl groups, acrylate groups, etc. A representative commercial example of a copolymerizable ionic surfactant is sodium styrene sulfonate available from Alfa Aesar.

Polymerization initiators useful in preparing the acrylate adhesive polymers used in the present disclosure are initiators that, on exposure to heat, generate free-radicals, which initiate (co)polymerization of the monomer mixture. Water-soluble initiators are useful for preparing the acrylate polymers by emulsion polymerization. Suitable water-soluble initiators include but are not limited to those selected from the group consisting of potassium persulfate, ammonium persulfate, sodium persulfate, and mixtures thereof, oxidation-reduction initiators such as the reaction product of the above-mentioned persulfates and reducing agents such as those selected from the group metabisulfites, formaldehyde sulfoxylate, 4,4'-azobis(4-cyanopentanoic acid) and its soluble salts (e.g., sodium, potassium). When used, initiators may comprise from about 0.05 to about 1 part by weight, or about 0.1 to about 0.5 part by weight based on 100 parts by weight of monomer components in the adhesive. A final oxidation/reducing initiator pair can be added at the end of the reaction to increase conversion.

Catalysts can be used to accelerate the free radical generation. Examples include ferrous sulfate and ethylene diamine tetra-acetic acid (EDTA).

The copolymerizable emulsion mixture may optionally further comprise chain transfer agents to control the molecular weight of the resultant polymer. Examples of useful chain transfer agents include, but are not limited to, those selected from at least one of carbon tetrabromide, alcohols, mercaptans such as, for example, isooctyl thioglycolate, and mixtures thereof.

In addition to the components described above, the following additives may also be included in the adhesive emulsion compositions of the present disclosure: inhibitors such as hydroquinone, pigments, dyes, rheology modifiers, thickeners, tackifiers, antioxidants, UV stabilizers, fillers, preservatives, biocides, and defoamers.

Another class of additives that may be included is corrosion inhibitors. Suitable examples include, but are not limited to, metallic ions such as $Zn^{+2}$ (zinc (II)), $CrO4^{-2}$ (chromate), and $MoO4^{-2}$ (molybdate); inorganic phosphates such as orthophosphate and pyrophosphate; organophosphonates such as 2-phosphono-butane-1,2,4-tricarboxylic acid, 1-hydroxyethylidene-1,1-diphosphonic acid, and 2-hydroxy-phosphonoacetic acid; organophosphinates; organosulfonates; and organometallic esters such as "CRODACOR OME FE" available from Croda Coatings & Polymers, Croda USA, New Castle, Del.

These additives, if used, are present in conventional concentrations well known to those skilled in the art and to the extent they do not unacceptably affect the advantages provided by the present disclosure.

Non-aqueous solvents may be employed in the aqueous emulsion of the present disclosure in small amounts if desired. In one embodiment, the amount of non-aqueous solvent may be 3 wt % or less based on the adhesive solids in the aqueous composition. In another embodiment it may be 1 wt % or less. In a further embodiment it may be 0.5 wt % or less. In some embodiments the amount of non-aqueous solvent is from 0 to 0.2 wt %. Examples of appropriate non-aqueous solvents include, but are not limited to, toluene, acetone, methylethylketone, cyclohexane, monohydric alcohols such as methanol and ethyl alcohol, and polyhydric alcohols.

The fast-setting, one part, aqueous, acrylic adhesive emulsions of the present disclosure have a pH value of 6.5 or less as determined using a standard pH meter or pH paper as is known to those skilled in the art. In some embodiments the pH of the emulsion is 6.0 or less. In some embodiments the pH is 5.5 or less. In some embodiments the pH is 5.0 or less. In some embodiments the pH is 3.0 or greater. In some embodiments the pH is 3.5 or greater. In some embodiments the pH is 4.0 or greater.

The core-shell polymeric component of the one part, aqueous, acrylic adhesive emulsion has a particle size of 200 nanometers (nm) or less as determined by dynamic light scattering measurements. In some embodiments the particle size is 175 nm or less. In some embodiments the particle size is 150 nm or less. In some embodiments the particle size is 140 nm or less. In some embodiments the particle size is 110 nm or less. In some embodiments the particle size is greater than 50 nm. In some embodiments the particle size is greater than 100 nm. In some embodiments the particle size is 130 nm or greater.

After the core-shell emulsion has been made, and the pH adjusted if needed, the polyfunctional component is added, for example, in the form of an aqueous solution or as a solid which then is dissolved.

The fast-setting, one part, aqueous, acrylic adhesive emulsions of the present disclosure exhibit a viscosity of 100 centipoise (100 mPa-s) or greater. In some embodiments the emulsions posses a viscosity of at least 300 centipoise (300 mPa-s). In some embodiments the emulsions have a viscosity of 10,000 centipoise (10,000 mPa-s) or less. In some embodiments the viscosity is 3000 centipoise (3000 mPa-s) or less. In some embodiments the viscosity is 1000 centipoise (1000 mPa-s) or less. In some embodiments the emulsions have a viscosity of 500 centipoise (500 m Pa-s) or less.

The fast-setting, one part, aqueous, acrylic adhesive emulsions of the present disclosure may be used to adhere a wide range of substrates including wood; metal, such as cold-rolled steel and aluminum; fabric; paper; leather; foam; plastic, such as polyvinylchloride, polystyrene, polyethylene, polypropylene, and acrylonitrile butadiene styrene (ABS), fiberglass, and materials used to construct high pressure laminates, for example, for counter tops.

Certain applications, e.g., bonding foam in the furniture industry, often require that soon after applying the adhesive emulsion to one, or both, of the substrates to be contacted and pressing the coated substrates together an adhesive bond is quickly formed at room temperature. That is, a bond of sufficient handling strength is formed to hold the substrates together and resist subsequent forces on the fresh bondline which might cause failure. As used herein "fast-set" and "fast-setting" refer to those adhesives that provide the desired handling strength soon after application of the adhesive to either one or both substrates and joining them together at room temperature. To determine whether an adhesive is a fast-set adhesive, a pinch bond test may be utilized.

Pinch bonds, or knife-edge bonds, are used to evaluate if an adhesive formulation exhibits the desired handling strength development and enable immediate handling and processing during manufacture of foam rubber cushions used in furniture. Such bonds require more strength build-up than needed to form a typical bond since the former results in a bond-line under stress once the bond is made whereas the latter does not.

In the use of the adhesive emulsions of the present disclosure drying must be able to occur either prior to joining the substrates together, for example when both have non-porous surfaces, or after joining, for example if one or both substrates are porous in nature. The adhesive emulsion may be applied to either one or both substrates prior to joining them together.

When at least one porous substrate, such as a foam, is employed, the fast-setting, one part, aqueous emulsions of the present disclosure may provide suitable pinch bond strengths at room temperature within 90 seconds or less of application to the substrate. In some embodiments an acceptable pinch bond may be formed at room temperature within 60 seconds or less of application. In some embodiments a pinch bond may be formed at room temperature within 30 seconds or less of application. In some embodiments an adequate pinch bond may be provided at room temperature within approximately 15 seconds or less after application.

It is also possible to bond two non-porous substrates using the presently disclosed emulsions. In such cases longer drying times are necessary prior to joining them together. For example, suitable bond strengths may be formed at room temperature within 10 minutes or less of application. In some embodiments a suitable bond strength may be formed at room temperature within 5 minutes or less of application. In some embodiments a suitable bond strength may be provided at room temperature within 1 minutes or less of application. In some cases the use of heat may be employed to shorten the drying time.

Surprisingly, and advantageously, the adhesive emulsions of the present disclosure are able to provide, in some embodiments, desirable handling strengths without the need for significant drying prior to forming the bond. After the initial bond is formed drying continues to takes place and bond strength builds. These advantages are achieved at room temperature, without the need for applied heat. Without wishing to be bound by theory, it is believed that the ability to provide rapid development of handling strength without the need for significant drying is due, at least in part, to the present disclosed adhesive emulsions having a pH of 6.5 or less and the presence of a surfactant that is substantially anionic in nature and present in a low amount (e.g., 1.5 parts total surfactant per 100 parts total core-shell polymer component). The use of the polyfunctional component also contributes to the fast-setting characteristics of the emulsion as well as providing for a crosslinking reaction over time that causes the bond strength to build up to its ultimate value After the initial bond with sufficient handling strength is formed drying continues to takes place and the bond strength increases until finally reaching its ultimate strength. This process may take anywhere from a few to several hours (e.g., 2 to 24 hours) at room temperature. This time may be shortened by application of heat, such as temperatures between 100 and 200° F. (38 to 93° C.). When heat is employed the ultimate strengths may be obtained in as little as 30 minutes or less. In addition, the adhesive emulsions of the present disclosure may be used to provide for the formation of bonds having not only suitable handling strength shortly after application but, which, after ultimate bond strength has been reached, will also hold together even after exposure to temperatures of 140° F. (60° C.), or even 160° F. (71° C.), for as long as 16 hours.

The fast-setting, one part, aqueous, acrylic adhesive emulsions of the present disclosure also exhibit desirable open times, by which it is meant the time that elapses after application of the emulsion to one or both substrates before they are joined and a bond is formed. This feature is advantageous from the perspective that large scale operations often necessitate a significant time lapse between the application and joining steps due to the number of substrates involved, etc. The adhesive emulsions of the present disclosure may exhibit open times of up to 60 minutes in some embodiments, up to 40 minutes in some embodiments, and up to 20 minutes in some embodiments, while still providing high handling strengths immediately upon bonding the substrates together at room temperature.

The fast-setting, one part, aqueous, acrylic adhesive emulsions may also advantageously provide articles, which have been initially bonded and developed handling strength, yet are separable, repositionable, and re-bondable. Such a characteristic is particularly useful when the bonded pieces have not been properly aligned prior to bonding.

The fast-setting, one part, aqueous, acrylic adhesive emulsions of the present disclosure may be applied to substrates in a variety of ways known to those skilled in the art including, for example, spraying, brushing, wiping, coating, and mechanical printing methods such as gravure and curtain coating.

In some embodiments the adhesive emulsions may be applied by spraying from a single container.

Various modifications and alterations of this disclosure will become apparent to those skilled in the art without departing from the scope and spirit of this disclosure.

EXAMPLES

Materials

| Designation | Description | Source |
| --- | --- | --- |
| 2-EHA | 2-ethyl hexyl acrylate monomer | BASF Corporation, Mt. Olive, NJ |
| IBOA | Isobornyl acrylate monomer | San Esters Corporation, New York, NY |
| Styrene | Styrene monomer, 99% | Alfa Aesar, Ward Hill, MA |
| BA | Butyl acrylate monomer | BASF Corporation, Mt. Olive, NJ or Arkema, Incorporated, King of Prussia, PA |
| MMA | Methyl methacrylate monomer, 99% | Alfa Aesar, Ward Hill, MA |
| MAA | Methacrylic acid monomer, 99% | Alfa Aesar, Ward Hill, MA |
| MA | Methyl acrylate monomer | BASF Corporation, Mt. Olive, NJ, or The Dow Chemical Company, Midland, MI |
| DAAM | Diacetone acrylamide monomer, 99% | Alfa Aesar, Ward Hill, MA |
| AAD | Adipic acid dihydrazide, a nucleophilic crosslinker, 97% | Alfa Aesar, Ward Hill, MA |
| DS-10 | RHODACAL DS-10; sodium dodecylbenzene sulfonate, a surfactant | Rhodia, Incorporated, Cranbury, NJ |
| Foam Cubes | A polyurethane foam obtained under the designation 1650 Gray and having a density of 1.45 lbs/ft$^3$ (23.2 kg/m$^3$) (ASTM D-3574-95) and a indentation load deflection at 25% deflection of 50 lbs/50 square inches (6.89 KPa) (per ASTM D-3574-95, 4 inch (10.2 cm) specimen) | Foam Fabricators of Minnesota, Incorporated, Maple Lake, MN |

All amounts reported in the examples below are given in parts by weight unless otherwise specified.

Test Methods

Glass Transition Temperature (Tg)

The glass transition temperature (Tg) of copolymers was calculated from the monomeric composition of the copolymer using the Tg values of all corresponding homopolymers, according to the Fox equation:

$$(1/Tgm) = (w1/Tg1) + (w2/Tg2) + (w3/Tg3) + \ldots$$

where:

Tgm is the Tg of the copolymer (in degrees Kelvin);
Tg1 is the Tg of the homopolymer of comonomer 1 (in degrees Kelvin);
Tg2 is the Tg of the homopolymer of comonomer 2;
Tg3 is the Tg of the homopolymer of comonomer 3, etc.; and
w1 is the weight fraction of comonomer 1 in the copolymer;
w2 is the weight fraction of comonomer 2 in the copolymer;
w3 is the weight fraction of comonomer 3 in the copolymer, etc.

pH

The pH of the adhesive emulsions was measured using pH paper (Examples 1-4 and Comparative Examples 1-3) or an "OMEGA" PHB-212 pH meter with probe (available from Omega Engineering, Incorporated, Stamford, Conn.) having a digital readout (Example 5).

Particle Size

Particle size and distribution measurements were made using a Zetasizer Nano S Dynamic Light Scattering (DLS) instrument (available from Malvern Instruments, Incorporated, Westborough, Mass.). One drop of the emulsion was diluted with about 2 ml of deionized water in a 4 ml polystyrene cuvette. The intensity weighted average particle size as provided by the instrument software was recorded.

Viscosity

Viscosity measurements were made at room temperature (ca. 70° F. (21° C.)) using a Brookfield viscometer with a #3 RV spindle at either 20 or 30 rpm. The viscosities were measured in centipoises and converted to milliPascal-seconds.

Sprayability

The adhesive emulsion was sprayed using a spray gun, such as that commercially available under the trade designation "3M ACCUSPRAY" Spray Gun Model HG09 from 3M Company, St. Paul, Minn., with fan at an incoming pressure of approximately 40 psi (276 KPa) and a fluid (spray exit) pressure of approximately 10 psi (69 KPa). Any clogging or blocking at the spray nozzle was noted and a subjective assessment regarding sprayability was made.

Pinch Bond

A pinch bond, also known as a knife-edge bond, refers to forming a foam to foam bond after application of an adhesive composition. Samples of a high-load bearing foam cut into 4 inch (10.2 cm) cubes were used as a substrate. The foam cube samples were placed flat, providing a top face of the cube having two pairs of parallel, opposing edges. The top face was sprayed with from 0.75 g to 2 g of a wet adhesive emulsion at room temperature. After a short period of time (e.g. 15 seconds) at room temperature one pair of opposing edges was then brought into aligned contact such that the center part of the top face was pushed inwards, pinched towards the center of the cube, and the coated surfaces contacted for a few seconds using hand pressure. This was repeated until the bond held together after hand pressure was released. The time it took to reach this point (i.e. the time elapsed from when the adhesive is sprayed until the bond to holds together when hand pressure is released) is referred to as the pinch bond time. Pinch bond times are indicative of the relative rate of handling strength buildup, that is, the lower the "pinch bond" time the more quickly the bond has developed handling strength. This provides a measure of how long it takes to form an article which may be handled for further processing. For some samples, a piece of 2 inch (5.1 cm) wide masking tape was applied to half of the face surface of the foam block along one of its edges to mask off one half the face area. After spraying adhesive onto the unmasked surface the masking tape was removed leaving only half of the cube face coated with adhesive. The pinch bond was then formed by bringing the coated half of the foam cube face into contact with the uncoated half.

Pinch Bond Stability

Pinch bond stability is the temperature at which a pinch bond remains closed for a minimum of 16 hours. Samples are prepared for the emulsion composition to be tested by forming a pinch bond (as described above). The samples were then conditioned at between 65 and 75° F. (18 and 24° C.) for at least 16 hours. If the bond of a sample remained intact at room temperature (RT) then that same sample was placed in an oven at 140° F. (60° C.) for at least 16 hours. If the bond of a sample remained intact at 140° F. (60° C.) then that same sample was placed in an oven at 160° F. (71° C.). Bond failure was observed by the opening the bond (i.e. the separation of the previously bonded surfaces). The highest temperature reached by a sample without failing was recorded as the pinch bond stability temperature.

Preparation of Acrylic Emulsions

Example 1

A mixture of 19.46 parts deionized water, 0.08 parts DS-10 anionic surfactant, 0.04 parts of sodium hydrogen carbonate buffer (99.7-100%, obtained from EMD Chemical, Incorporated, Gibbstown, N.J.), 2.39 parts 2-EHA, and 1.63 parts IBOA was stirred and heated under nitrogen in a 5-neck reactor flask equipped with a reflux condenser, temperature probe, mechanical stirrer, metering pump, and feeding funnel. When the temperature of the mixture reached 74° C., an initiator solution of 0.04 parts of ammonium persulfate (98%, obtained from Alfa Aesar, Ward Hill, Mass.) in 0.34 parts of deionized water was added in a single shot ("one shot", meaning all at once) to the flask. The reaction was allowed to exotherm, then kept at 78° C. for 30 minutes to provide the seed emulsion. Next, an initiator solution containing 0.09 parts potassium persulfate (97%, obtained from Alfa Aesar, Ward Hill, Mass.) and 0.69 parts deionized water was added in one shot. After mixing for two minutes, a milk-like pre-emulsion containing 21.73 parts deionized water, 0.40 parts DS-10 anionic surfactant, 11.64 parts 2-EHA, 4.34 parts BA, and 14.01 parts styrene was fed in the reactor via a precision pump over a period of 140 minutes. After completion of this addition step, the reactants were heated for 20 minutes at 78° C. to provide the polymeric core of the core-shell polymeric component. Next, an initiator solution containing 0.03 parts potassium persulfate and 0.57 parts deionized water was added in one shot. After mixing for two minutes, two additional feedings were simultaneously dripped into the reactor flask over a period of 70 minutes to provide the polymeric shell of the core-shell polymeric component. One feeding was an aqueous solution including 4.04 parts deionized water and 0.38 parts DAAM; the other feeding was a monomer mixture containing 12.53 parts BA, 0.75 parts MAA, and 4.83 parts MMA. After these additions were complete the reaction mixture was agitated and maintained at 78° C. for 45 minutes. The resulting emulsion was quickly cooled using an ice bath to 25° C., approximately 0.01 part hydroquinone inhibitor (99%, Alfa Aesar, Ward Hill, Mass.) was added and dissolved, and the emulsion then filtered through cheesecloth. The one part, aqueous, acrylic adhesive emulsion was gravimetrically determined to have a solids content of 50.3 wt %, and gas chromatography revealed a monomer conversion of 99.0%. Glass transition temperature, particle size, and viscosity were measured, then 0.9 parts by weight of a 10 wt % aqueous solution of AAD was to 50 parts by weight of the acrylic adhesive emulsion to provide the emulsion of the present disclosure. The fast-setting, one part, aqueous, acrylic adhesive emulsion was evaluated for sprayability, pinch bond strength, and pinch bond stability. The results are reported in Table 2 below.

Comparative Example 1

Comparative Example 1 was prepared in the same manner as described for Example 1 except no polyfunctional component (AAD) was added.

Example 2

A mixture of 39.28 parts deionized water, 0.36 parts DS-10 anionic surfactant, 0.07 parts of sodium hydrogen carbonate, 0.0003 parts ferrous sulfate heptahydrate (99.6%, obtained from J. T. Baker, Phillipsburg, N.J.), 15.68 parts 2-EHA, and 13.35 parts IBOA was stirred and heated under nitrogen in a 5-neck reactor flask equipped with a reflux condenser, temperature probe, mechanical stirrer, metering pump, and feeding funnel. When the temperature of the mixture reached 32° C., a solution of 0.08 parts ammonium persulfate, 0.02 parts sodium metabisulfite initiator (97%, obtained from Alfa Aesar, Ward Hill, Mass.), 0.02 parts sodium styrene sulfonate surfactant (obtained from Alfa Aesar, Ward Hill, Mass.), and 1.0 part of deionized water were added in one shot to the flask and the reactants heated to 55° C. and allowed to exotherm. The reaction was then kept at 80° C. for 50 minutes to provide the polymeric core of the core-shell polymeric component. Next, an initiator solution containing 0.03 parts potassium persulfate and 0.77 parts deionized water was added in one shot. After mixing for two minutes, a milk-like pre-emulsion containing 8.96 parts deionized water, 0.07 parts DS-10 anionic surfactant, 13.51 parts BA, 5.30 parts MMA, 0.79 parts MAA, and 0.20 parts DAAM was fed in the reactor via a precision pump over a period of 70 minutes. After completion of this addition step, the reactants were heated for 40 minutes at 80° C. to provide the polymeric shell of the core-shell polymeric component. Next, 0.33 parts of an aqueous solution of t-butyl hydroperoxide initiator (3.46 wt %) (obtained as a 70% aqueous solution from Alfa Aesar, Ward Hill, Mass., and further diluted) and 0.24 parts of a 1.88 wt % aqueous solution of sodium formaldehyde sulfoxylate dihydrate initiator (obtained as a solid from Alfa Aesar, Ward Hill, Mass.) were added in one shot. Mixing at was continued for another 15 minutes after which another of 0.23 parts of sodium formaldehyde sulfoxylate dihydrate solution was added and mixing/heating continued for a final 15 minutes. The resulting emulsion was quickly cooled using an ice bath to 25° C., approximately 0.01 part hydroquinone inhibitor was added, and the emulsion then filtered through cheesecloth. The final fast-setting, one part, aqueous, acrylic adhesive emulsion was gravimetrically determined to have a solids content of 48.5 wt %, and gas chromatography revealed a monomer conversion of 99.9%. Glass transition temperature, particle size, and viscosity were measured, then 0.9 parts by weight of a 10 wt % aqueous solution of AAD was to 50 parts by weight of the acrylic adhesive emulsion to provide the emulsion of the present disclosure. The fast-setting, one part, aqueous, acrylic adhesive emulsion was evaluated for sprayability, pinch bond strength, and pinch bond stability. The results are reported in Table 2 below.

Comparative Example 2

Comparative Example 2 was prepared in the same manner as described for Example 2 except no polyfunctional component (AAD) was added.

Example 3

A mixture of 38.70 parts deionized water, 0.39 parts DS-10 anionic surfactant, 0.07 parts of sodium hydrogen carbonate, 0.0003 parts ferrous sulfate heptahydrate, 13.76 parts 2-EHA, 9.17 parts IBOA, and 5.73 parts MA was stirred and heated under nitrogen in a 5-neck reactor flask equipped with a reflux condenser, temperature probe, mechanical stirrer, metering pump, and feeding funnel. When the temperature of the mixture reached 50° C., a solution of 0.08 parts ammonium persulfate, 0.03 parts sodium metabisulfite and 0.88 parts of deionized water were added in one shot to the flask. The temperature was kept at 50° C. for 10 minutes then the reactants heated to 60° C. and allowed to exotherm. The reaction was then kept at 78° C. for 15 minutes to provide the polymeric core of the core-shell polymeric component. Next, an initiator solution containing 0.03 parts potassium persulfate and 1.10 parts deionized water was added in one shot. After mixing for two minutes, a milk-like pre-emulsion containing 9.59 parts deionized water, 0.06 parts DS-10 anionic surfactant, 13.38 parts BA, 5.36 parts MMA, 0.80 parts MAA, and 0.20 parts DAAM was fed in the reactor via a precision pump over a period of 70 minutes. After completion of this addition step, the reactants were heated for 40 minutes at 78° C. to provide the polymeric shell of the core-shell polymeric component. Next, 0.33 parts of an aqueous solution of t-butyl hydroperoxide initiator (8.48 wt %) and 0.21 parts of an aqueous solution of sodium formaldehyde sulfoxylate dihydrate initiator (4.76 wt %) were added in one shot. Mixing at 78° C. was continued for another 15 minutes after which another of 0.21 parts of sodium formaldehyde sulfoxylate dihydrate solution were added in one shot and mixing/heating continued for a final 15 minutes. The resulting emulsion was quickly cooled using an ice bath to 25° C., approximately 0.01 part hydroquinone inhibitor was added and dissolved, and the emulsion then filtered through cheesecloth. The one part, aqueous, acrylic adhesive emulsion was gravimetrically determined to have a solids content of 48.0 wt %, and gas chromatography revealed a monomer conversion of 99.6%. Glass transition temperature, particle size, and viscosity were measured, then 0.9 parts by weight of a 10 wt % aqueous solution of AAD was to 50 parts by weight of the acrylic adhesive emulsion to provide the emulsion of the present disclosure. The fast-setting, one part, aqueous, acrylic adhesive emulsion was evaluated for sprayability, pinch bond strength, and pinch bond stability. The results are reported in Table 2 below.

Comparative Example 3

Comparative Example 3 was prepared in the same manner as described for Example 3 except no polyfunctional component (AAD) was added.

Example 4

A mixture of 38.71 parts deionized water, 0.39 parts DS-10 anionic surfactant, 0.08 parts of sodium hydrogen carbonate, 0.0006 parts ferrous sulfate heptahydrate, 13.77 parts 2-EHA, 9.18 parts IBOA, and 5.77 parts MA was stirred and heated under nitrogen in a 5-neck reactor flask equipped with a reflux condenser, temperature probe, mechanical stirrer, metering pump, and feeding funnel. When the temperature of the mixture reached 40° C., a solution of 0.07 parts ammonium persulfate, 0.02 parts sodium metabisulfite and 0.88 parts of deionized water were added in one shot to the flask. The temperature was kept at 40° C. for 20 minutes after which 0.01 parts sodium metabisulfite and 0.22 parts of deionized water were added in one shot to the flask and the reactants allowed to exotherm. The reaction was then kept at 78° C. for 10 minutes to provide the polymeric core of the core-shell polymeric component. Next, an initiator solution containing 0.03 parts potassium persulfate and 1.10 parts deionized water was added in one shot. After mixing for two minutes, a milk-like pre-emulsion containing 9.41 parts deionized water, 0.06 parts DS-10 anionic surfactant, 0.04 parts of sodium hydrogen carbonate, 13.39 parts BA, 5.61 parts MMA, 0.40 parts MAA, and 0.29 parts DAAM was fed in the reactor via a precision pump over a period of 70 minutes. After completion of this addition step, heating was continued at 78° C. for 40 minutes to provide the polymeric shell of the core-shell polymeric component. Next, 0.31 parts of an aqueous solution of t-butyl hydroperoxide initiator (8.31 wt %) and 0.25 parts of an aqueous solution of sodium formaldehyde sulfoxylate dihydrate initiator (3.78 wt %) were added in one shot. Mixing at 78° C. was continued for another 15 minutes after which another of 0.21 parts of sodium formaldehyde sulfoxylate dihydrate solution were added in one shot and mixing/heating continued for a final 15 minutes. The resulting emulsion was quickly cooled using an ice bath to 25° C., approximately 0.01 part hydroquinone inhibitor was added and dissolved, and the emulsion then filtered through cheesecloth. The final fast-setting, one part, aqueous, acrylic adhesive emulsion was gravimetrically determined to have a solids content of 47.8 wt %, and gas chromatography revealed a monomer conversion of 99.5%. Glass transition temperature, particle size, and viscosity were measured, then 0.9 parts by weight of a 10 wt % aqueous solution of AAD was to 50 parts by weight of the acrylic adhesive emulsion to provide the emulsion of the present disclosure. The fast-setting, one part, aqueous, acrylic adhesive emulsion was evaluated for sprayability, pinch bond strength, and pinch bond stability. The results are reported in Table 2 below.

Example 5

A mixture of 38.71 parts deionized water, 0.39 parts DS 10 anionic surfactant, 0.11 parts of a 0.27 wt % ferrous sulfate heptahydrate solution, 0.07 parts sodium bicarbonate, 13.91 parts 2-EHA, 5.79 parts MA, and 9.06 parts IBOA was stirred and heated under nitrogen and constant agitation in a 4-neck jacketed reactor flask equipped with a reflux condenser, temperature probe, mechanical stirrer, metering pump, and feeding funnel. When the temperature of the mixture reached 78° C., an initiator solution of 0.07 parts of potassium persulfate and 0.06 parts sodium metabisulfite in 0.88 parts of deionized water was added in one charge to the flask. The reaction was allowed to exotherm, then kept at 68° C. for 20 minutes to provide the polymeric core of the core-shell polymeric component. Next, an initiator solution containing 0.03 parts potassium persulfate and 1.10 parts deionized water was added in one shot. After mixing for two minutes, a pre-emulsion containing 9.56 parts deionized water, 0.06 parts DS 10 anionic surfactant, 0.29 parts DAAM, 10.65 parts BA, 7.93 parts MMA, and 0.77 parts MAA was fed into the reactor via a precision pump over a period of 105 minutes while maintaining a reaction temperature of 68° C. After completion of this addition step, the reactor contents were held under constant agitation for one hour at 68° C. to provide the polymeric shell of the core-shell polymeric component. Next, unreacted monomer was scavenged by the addition of one charge each of 0.23 parts of 7.5 wt % aqueous t-butyl hydroperoxide solution and 0.49 parts of 3.3 wt % sodium formaldehyde sulfoxylate solution. After stirring for 15 minutes at 68° C. another charge of each was added and mixed an additional 15 minutes. The resulting emulsion was cooled to 25° C., and filtered through a 150 micron polyester filter bag, such as that commercially available under the trade designation "CUNO 150" from 3M Company, St. Paul, Minn. The one part, acrylic adhesive emulsion was gravimetrically determined to have a solids content of 46.5%. Glass transition temperature, particle size, and viscosity were measured, then 0.9 parts by weight of a 10 wt % aqueous solution of AAD was to 50 parts by weight of the acrylic adhesive emulsion to provide the emulsion of the present disclosure. The fast-setting, one part, aqueous, acrylic adhesive emulsion was evaluated for sprayability, pinch bond strength, and pinch bond stability. The results are reported in Table 2 below.

TABLE 1

| Ex | Seed Monomers | Core Monomers | Shell Monomers | Monomer Wt. Ratio (Seed:Core:Shell) | Emulsion % Solids | Polyfunctional Component (eqvts/eqvt.pfg*) |
|---|---|---|---|---|---|---|
| 1 | 2EHA:IBOA/ 59.5:40.5 | 2EHA:BA:Styrene/ 38.8:14.5:46.7 | BA:MAA:MA:DAAM/ 67.8:4.1:26.1:2.1 | 7.7/57.1/35.2 | 50.3 | AAD (0.92) |
| CE1 | Same as 1 | Same as 1 | Same as 1 | 7.7/57.1/35.2 | 50.3 | None |
| 2 | — | 2EHA:IBOA/ 54:46 | BA:MAA:MA:DAAM/ 68.0:4.0:26.7:1.4 | 59.4/40.6 | 48.5 | AAD (1.26) |
| CE2 | — | Same as 2 | Same as 2 | 59.4/40.6 | 48.5 | None |
| 3 | — | 2EHA:IBOA:MA/ 48:32:20 | BA:MAA:MMA:DAAM/ 67.5:4.0:27.0:1.5 | 59.1/40.9 | 48.0 | AAD (1.20) |
| CE3 | — | Same as 3 | Same as 3 | 59.1/40.9 | 48.0 | None |
| 4 | — | 2EHA:IBOA:MA/ 47.9:32.0:20.1 | BA:MAA:MMA:DAAM/ 68.0:2.0:28.5:1.5 | 59.3/40.7 | 4708 | AAD (1.20) |
| 5 | — | 2EHA:IBOA:MA/ 48.4:31.5:20.1 | BA:MAA:MMA:DAAM/ 54.2:3.9:40.4:1.5 | 59.4/40.6 | 46.5 | AAD (1.20) |

*Pfg: pendent functional group on polymeric shell of core-shell polymer

CE = comparative example

TABLE 2

| Ex | Core Tg (C.) | Shell Tg (C.) | pH | Particle Diameter (nm) | Viscosity (cPoise) | Sprayability | Pinch Bond | Pinch Bond Stability |
|---|---|---|---|---|---|---|---|---|
| 1 | 0 | −20 | 3.5 | 146 | 1000[1] (1000 mPa-s) | No spray gun nozzle blocking | Formed pinch bond approximately 30 sec. after spraying the adhesive | Passed RT and 140° F. (60° C.); Failed at 160° F. (71° C.) |
| CE1 | 0 | −20 | 3.5 | 146 | 1000[1] (1000 mPa-s) | No spray gun nozzle blocking | Cannot hold pinch bond | Not Tested |
| 2 | 0 | −20 | 5.5 | 135 | 356[2] (356 mPa-s) | No spray gun nozzle blocking | Formed pinch bond almost immediately. Able to form pinch bond for up to 20 min. (open time) after adhesive application. | Passed RT; 140° F. (60° C.); and 160° F. (71° C.) |
| CE2 | 0 | −20 | 5.5 | 135 | 356[2] (356 mPa-s) | No spray gun nozzle blocking | Cannot hold pinch bond | Not Tested |
| 3 | −5 | −20 | 5.5 | 130 | 618[2] (618 mPa-s) | No spray gun nozzle blocking | Formed pinch bond immediately after spraying. | Passed RT; 140° F. (60° C.); and 160° F. (71° C.) |
| CE3 | −5 | −20 | 5.5 | 130 | 618[2] (618 mPa-s) | No spray gun nozzle blocking | Cannot hold pinch bond | Not Tested |
| 4 | −5 | −20 | 5.2 | 102 | 600[1] (600 mPa-s) | Blocked spray nozzle once during spraying | Application to both substrate surfaces: formed pinch bond about 30 sec. after spraying. = Application to one substrate surface: formed pinch bond approx. 1 min. after spraying. | Both samples passed RT and 160° F. (71° C.) |
| 5 | 0 | 0 | 5.1 | 109 | 550[1] (550 mPa-s) | No spray gun nozzle blocking | Formed pinch bond approx. 1 min. after applying adhesive. | Passed RT; 140° F. (60° C.); and 160° F. (71° C.) |

[1] Viscosity was measured at 20 rpm.
[2] Viscosity was measured at 30 rpm.

Repositionability—I

The adhesive composition of Example 4 was sprayed at room temperature onto the top surface of two foam cubes, each measuring 4 inches×4 inches×4 inches (10.2×10.2×10.2 cm), to give a coating weight of between 1.0 and 1.6 g of wet adhesive emulsion. After approximately 15 seconds at room temperature, the two adhesive emulsion coated surfaces were brought into contact with each other using only very light finger pressure to provide a bonded foam article. After one minute at room temperature the bonded pieces were separated by hand, slightly repositioned, and then brought into contact with each other once again as before. After one additional minute the re-bonded pieces were separated again, repositioned as before, and then brought into contact with each using enough pressure to deform the foam. The bonded foam article was conditioned overnight at room temperature after which an attempt was made to separate the bonded pieces by hand. The attempt failed and the foam tore apart.

Repositionability—II

Two foam cubes were bonded together as described in the "Repositionability—I" evaluation described above with the following exception. Enough pressure was applied when joining the two foam cubes to deform the foam i.e. sufficient hand pressure was used to deform and press together blocks for each of the three joining steps. The pieces were separated after one minute, repositioned, then re-bonded together as before. Within a minute of re-bonding the bonded foam article was thrown across the floor without coming apart. Next it was conditioned overnight at room temperature after which an attempt was made to separate the bonded pieces by hand. The attempt failed and the foam tore apart.

Storage Stability

The storage stability of the fast-setting, one part, aqueous, acrylic emulsions of the present disclosure were evaluated by measuring pH, pinch bond time, and pinch bond stability of a typical emulsion both before and after storage at 120 F (49° C.) for 28 days as follows.

A final fast-setting, one part, aqueous, acrylic adhesive emulsion was prepared in a similar manner to Example 3. It was gravimetrically determined to have a solids content of 47.2 wt % and a monomer conversion of 96.0%. The resulting polymer had monomer weight ratios of 59.4:40.6/ core:shell. The core was a copolymer of 48.4:31.5:20.1/ EHA:IBOA:MA (w/w). The shell was a copolymer of 68.0: 26.6:3.9:1.5/BA:MMA:MAA:DAAM (w/w). After the reaction was complete, 0.9 parts of a 10% AAD aqueous solution was added to 50 parts of adhesive emulsion with gentle mixing. After initial testing, approximately 50 grams of the adhesive emulsion was placed in a glass jar with minimal headspace, the jar was sealed and placed in an oven at 120° F. (49° C.) for 28 days. During this time, the sample was periodically visually inspected for any clumping or coagulum in the adhesive emulsion. None was found. After 28 days the sealed jar was removed from the oven. There was no visual change in the appearance (clumping, coagulum, etc.) of the adhesive emulsion. The test results are shown in Table 3 below.

TABLE 3

| Conditioning | pH | Sprayability | Pinch Bond | Pinch Bond Stability |
|---|---|---|---|---|
| Initial | 5.75 | No spray gun nozzle blocking | Formed pinch bond in less than 60 sec. after spraying the adhesive | Passed RT and 160° F. (71° C.) |
| After Aging | 5.22 | No spray gun nozzle blocking | Formed pinch bond in less than 60 sec. after spraying the adhesive | Passed RT and 160° F. (71° C.) |

The invention claimed is:

1. An emulsion comprising:
a) a core-shell polymeric component comprising:
   i. an inner core comprising a (meth)acrylate copolymer having a first glass transition temperature, and
   ii. an outer shell comprising a (meth)acrylate copolymer containing at least one pendent functional group and having a second glass transition temperature which is less than, or equal to, the first glass transition temperature;
b) a polyfunctional component capable of reacting with at least one of the pendent functional groups on the outer shell;
wherein the inner core is free of functional groups reactive with the pendent functional groups on the outer shell;
wherein the pH of the emulsion is 6.5 or less;
wherein the pendent functional group is selected from ketones; and
wherein the emulsion is a storage stable, repositionable, fast-setting, one part, aqueous, adhesive.

2. The emulsion of claim 1 wherein the inner core has a first glass transition temperature of +10° C. or less.

3. The emulsion of claim 1 wherein the number of functional group equivalents on the polyfunctional component is 0.5 to 1.5 for each pendent functional group equivalent on the polymeric shell component.

4. The emulsion of claim 1 wherein the polyfunctional component is selected from polyhydrazides and polyamines.

5. The emulsion of claim 1 wherein the core-shell component comprises between 25 and 83 wt % of the core component.

6. The emulsion of claim 1 wherein the particles of the emulsion have a diameter of 200 nm or less.

7. The emulsion of claim 1 wherein emulsion is of free of non-aqueous solvents.

8. An article comprising:
two substrates bonded together with an emulsion comprising:
a) a core-shell polymeric component comprising:
   i. an inner core comprising a (meth)acrylate copolymer having a first glass transition temperature, and
   ii. an outer shell comprising a (meth)acrylate copolymer containing at least one pendent functional group and having a second glass transition temperature which is less than, or equal to, the first glass transition temperature;
b) a polyfunctional component capable of reacting with at least one of the pendent functional groups on the outer shell;
wherein the inner core is free of functional groups reactive with the pendent functional groups on the outer shell;
wherein the pH of the emulsion is 6.5 or less;
wherein the pendent functional group is selected from ketones; and
wherein the emulsion is a storage stable, repositionable, fast-setting, one part, aqueous, adhesive.

9. The article of claim 8 wherein the two substrates are separable.

10. A method of joining two substrates comprising:
application onto at least one of the substrates of an emulsion comprising:
a) a core-shell polymeric component comprising:
   i. an inner core comprising a (meth)acrylate copolymer having a first glass transition temperature, and
   ii. an outer shell comprising a (meth)acrylate copolymer containing at least one pendent functional group and having a second glass transition temperature which is less than, or equal to, the first glass transition temperature;
b) a polyfunctional component capable of reacting with at least one of the pendent functional groups on the outer shell;
wherein the inner core is free of functional groups reactive with the pendent functional groups on the outer shell;
wherein the pH of the emulsion is 6.5 or less;
wherein the pendent functional group is selected from ketones; and wherein the emulsion is a storage stable, repositionable, fast-setting, one part, aqueous, adhesive; and joining them together.

11. The method of claim 10 further comprising repositioning the substrates.

12. The method of claim 10 wherein the emulsion is applied by brushing, spraying, wiping, rolling, or mechanical printing methods.

13. The method of claim 12 wherein the emulsion is applied by spraying from a single container.

14. The emulsion of claim 1 wherein the emulsion further includes an anionic surfactant and has a surfactant content of 1.5 parts (dry), or less, per 100 parts of core-shell polymer.

15. The article of claim 8 wherein the emulsion further includes an anionic surfactant and has a surfactant content of 1.5 parts (dry), or less, per 100 parts of core-shell polymer.

16. The method of claim 10 wherein the emulsion further includes an anionic surfactant and has a surfactant content of 1.5 parts (dry), or less, per 100 parts of core-shell polymer.

* * * * *